(12) United States Patent
Peng et al.

(10) Patent No.: US 12,724,879 B2
(45) Date of Patent: Sep. 1, 2026

(54) METHOD AND APPARATUS FOR DEVICE MANAGEMENT IN TARGET OPERATING SYSTEM

(71) Applicant: Alipay (Hangzhou) Information Technology Co., Ltd., Hangzhou (CN)

(72) Inventors: Yuke Peng, Hangzhou (CN); Hongliang Tian, Hangzhou (CN); Shoumeng Yan, Hangzhou (CN); Yinqian Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 38 days.

(21) Appl. No.: 19/017,148

(22) Filed: Jan. 10, 2025

(65) Prior Publication Data

US 2025/0232031 A1 Jul. 17, 2025

(30) Foreign Application Priority Data

Jan. 16, 2024 (CN) ......................... 202410063132.2

(51) Int. Cl.
*H04L 29/06* (2006.01)
*G06F 21/54* (2013.01)

(52) U.S. Cl.
CPC ........ *G06F 21/54* (2013.01); *G06F 2221/033* (2013.01)

(58) Field of Classification Search
CPC ........................... G06F 21/54; G06F 2221/033
See application file for complete search history.

(56) References Cited

FOREIGN PATENT DOCUMENTS

| | | | | |
|---|---|---|---|---|
| CN | 109388430 B | * | 7/2022 | ............ G06F 9/4411 |
| WO | WO-2015006923 A1 | * | 1/2015 | ......... G06F 9/44505 |

OTHER PUBLICATIONS

Qin, Boqin, et al. "Understanding memory and thread safety practices and issues in real-world Rust programs." Proceedings of the 41st ACM SIGPLAN Conference on Programming Language Design and Implementation. 2020. (Year: 2020).*

Sharma, Ayushi, et al. "Rust for embedded systems: current state, challenges and open problems." arXiv preprint arXiv:2311.05063 (2023). (Year: 2023).*

* cited by examiner

*Primary Examiner* — Shawnchoy Rahman

(74) *Attorney, Agent, or Firm* — Womble Bond Dickinson (US) LLP

(57) ABSTRACT

Embodiments of this specification provide a method and an apparatus for device management in a target operating system. The target operating system is written in a Rust language. The Rust language includes an unsafe keyword. The method relates to a device driver of a peripheral device and a device management module. The method includes: receiving, by an interface module in the device management module, a target request sent by the device driver, where the target request is an operation request related to interrupt configuration or access of the peripheral device, and the interface module includes no code segment using the unsafe keyword; performing, by the interface module, a security check related to the operation request; and after the security check succeeds, performing, by a kernel code module in the device management module, a target operation corresponding to the operation request by using code that includes the unsafe keyword.

20 Claims, 3 Drawing Sheets

Request

Interface module

Security assurance

Unsafe code

METHOD AND APPARATUS FOR DEVICE MANAGEMENT IN TARGET OPERATING SYSTEM

CROSS-RELATED APPLICATIONS

This specification claims priority to Chinese Patent Application No. 202410063132.2, filed with the China National Intellectual Property Administration on Jan. 16, 2024, which is incorporated herein by reference in its entirety.

TECHNICAL FIELD

One or more embodiments of this specification relate to a computer operating system, and in particular, to a method and an apparatus for device management in an operating system.

BACKGROUND

A Rust language is an emerging system programming language that can eliminate much of problematic code during compilation through a security check. In addition, there is no characteristics such as runtime and a garbage collection mechanism. Therefore, the Rust code runs much faster than languages such as Java and Python, and can be qualified for high-performance scenarios. These advantages make the Rust language increasingly popular.

A Rust compiler performs a mandatory check, so that no undefined behavior such as null pointer access is caused when a program runs, thereby eliminating much of problematic code during compilation. However, in Rust, there is a special keyword named unsafe, and the keyword can mark a code block to bypass some mandatory security checks on the code block by the compiler, but a programmer needs to be responsible for security of the code block. The keyword appears because there is no flexibility in some scenarios when code checked only by the compiler is used and consequently the program cannot perform special operations. To enable the program to have higher performance or implement special functions, the Rust compiler provides the unsafe keyword to grant higher permission to the program.

The unsafe keyword is mainly used in two scenarios: In a first scenario, the unsafe keyword marks a function, indicating that when using the function, the programmer needs to meet some conditions defined by the function, to ensure that the program does not generate undefined behavior. This is referred to as unsafe-marked code. In a second scenario, the unsafe keyword marks a process, including using a function or performing an unsafe operation defined by the compiler, for example, modifying a mutable static variable and dereferencing a raw pointer. This is referred to as unsafe-used code. In a scenario of the unsafe-used code, the programmer needs to ensure use security based on a condition that the function or the unsafe operation needs to meet.

The Rust language gradually demonstrates its advantages in the operating system field during development, attracting more people to use Rust to write operating systems. However, in an operating system written in Rust, use of the unsafe keyword is always a relatively significant problem. Incorrect use of the unsafe keyword is very prone to cause system instability or even crashes. Excessive use of the unsafe keyword causes a great trust burden and risk.

It is hoped that there can be an improved solution to alleviate the security and trust problems related to the unsafe keyword in the operating system written in Rust.

SUMMARY

One or more embodiments of this specification describe a method and an apparatus for device management of a peripheral device in an operating system written in Rust, to reduce a trusted base of the operating system in terms of device management, so as to improve system stability and security.

According to a first aspect, a method for device management in a target operating system is provided. The target operating system is written in a Rust language. The Rust language includes an unsafe keyword. The method relates to a device driver of a peripheral device and a device management module. The device driver is disposed at a non-privilege level and has no permission to use the unsafe keyword. The device management module is disposed at a privilege level and has permission to use the unsafe keyword. The method includes:

receiving, by an interface module in the device management module, a target request sent by the device driver, where the target request is an operation request related to interrupt configuration or access of the peripheral device, and the interface module includes no code segment using the unsafe keyword;

performing, by the interface module, a security check related to the operation request; and after the security check succeeds, performing, by a kernel code module in the device management module, a target operation corresponding to the operation request by using code that includes the unsafe keyword.

According to an implementation, the target request includes an interrupt function registration request of the peripheral device, and the interface module is an interrupt agent module that provides a first interface. In this case, the receiving, by an interface module, a target request sent by the device driver specifically includes: receiving, by the interrupt agent module, a call to the first interface from the device driver, where the call is used to request to obtain an interrupt vector number instance.

Further, in an embodiment, the security check includes: determining, by the interrupt agent module, that there is a first sequence number to be allocated to the device driver, and checking whether the first sequence number is occupied by another device driver or a CPU exception; and if it is ensured that the first sequence number is not occupied, returning an interrupt vector number instance to the device driver, where the interrupt vector number instance includes the first sequence number.

According to an embodiment, the method further includes: receiving, by the interrupt agent module, an interrupt processing function of the peripheral device from the device driver, where the interrupt processing function is imported through an interface provided in the interrupt vector number instance. Correspondingly, the performing, by a kernel code module, a target operation specifically includes: creating a registration object by using the code that includes the unsafe keyword, where the interrupt processing function and the first sequence number are associatively recorded in the registration object.

Further, in an embodiment, the method further includes: receiving, by the interrupt agent module, an interrupt request from the peripheral device, where the interrupt request includes the first sequence number; and determining, by the interrupt agent module, the interrupt processing function based on the first sequence number, and enabling a CPU to execute the interrupt processing function.

According to an embodiment, the device management module further includes an interrupt initialization module, the interrupt initialization module includes register configuration code and assembly code using the unsafe keyword, and the interrupt initialization module is verified to meet a first standard related to an interrupt procedure.

In an embodiment, the device management module further includes a CPU exception processing module, the CPU exception processing module modifies a restored register value by using the unsafe keyword, and the CPU exception processing module is verified to meet a second standard related to CPU exception processing.

According to another implementation, the target request includes an access request for the peripheral device, and the interface module is a device instance obtained by encapsulating an access path to the peripheral device. In this case, the security check includes: checking, by the device instance, whether an access address in the access request exceeds an address area range corresponding to the access path.

Further, in an example, the access request is an IO memory access request, and the device instance includes a structure instance that encapsulates an IO memory address area of the peripheral device.

In another example, the access request is an IO port access request, and the device instance includes a structure instance that encapsulates an IO port address area of the peripheral device.

According to an embodiment, the device management module further includes a bus module, and the method further includes: creating, by the bus module, the device instance, so that the device instance includes logic code for a security check.

Further, in an embodiment, the bus module is verified to meet a security standard related to a device instance, and the security standard requires that created device instances access only respective corresponding address ranges.

According to a second aspect, a device management apparatus in a target operating system is provided. The target operating system is written in a Rust language. The Rust language includes an unsafe keyword. The device management apparatus is disposed at a privilege level and has permission to use the unsafe keyword. The device management apparatus includes an interface module and a kernel code module.

The interface module is configured to receive a target request sent by a device driver of a peripheral device, where the target request is an operation request related to interrupt configuration or access of the peripheral device. The interface module includes no code segment using the unsafe keyword. The device driver is disposed at a non-privilege level and has no permission to use the unsafe keyword.

The interface module is further configured to perform a security check related to the operation request.

The kernel code module is configured to: after the security check succeeds, perform a target operation corresponding to the operation request by using code that includes the unsafe keyword.

According to a third aspect, a computer-readable storage medium is provided. The computer-readable storage medium stores a computer program, and when the computer program is executed in a computer, the computer is enabled to perform the method according to the first aspect.

According to a fourth aspect, a computing device is provided, and includes a storage and a processor. The storage stores executable code, and when the processor executes the executable code, the method according to the first aspect is implemented.

In the device management architecture provided in the embodiments of this specification, there is a clear boundary between privileged code and non-privileged code. The device driver is located at the non-privilege level and has no permission to use unsafe code. The device management module is located at the privilege level, and includes the kernel code module that directly uses the unsafe code and the interface module that does not include the unsafe code but provides a security protection mechanism to the device management module. In addition, the interface module further functions as an interface, and interacts with a driver program at the non-privilege level. In this way, the unsafe code cannot be used in the driver program, and the privilege level includes only the unsafe code and necessary related security protection code, and needs to be reviewed before being put into use. This restricts a programmer from arbitrarily using the unsafe keyword, and minimizes a trusted base of the operating system, thereby improving system stability and security.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following descriptions show merely some embodiments of this specification, and a person of ordinary skill in the art can still derive other drawings from these accompanying drawings without creative efforts.

DESCRIPTION OF EMBODIMENTS

Figure 1:
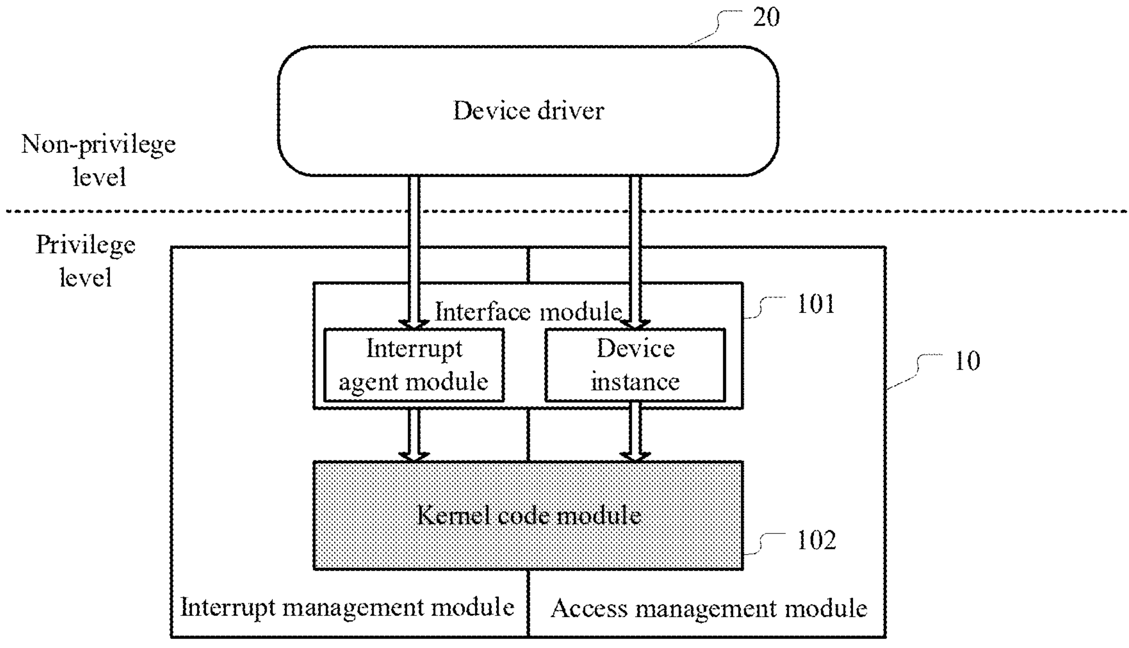
FIG. 1 is a schematic diagram of a device management architecture according to an embodiment.

The following describes, with reference to the accompanying drawings, the solutions provided in this specification.

In the following, an operating system written in a Rust language is briefly referred to as a Rust operating system. As described above, Rust provides an unsafe keyword, and some mandatory checks by a Rust compiler can be avoided for a code segment identified by the keyword. Therefore, a trusted base of the Rust operating system closely depends on use of the unsafe keyword.

A trusted base is a set of all security protection mechanisms for implementing security protection of a computer system. The trusted base of the Rust operating system includes all modules using the unsafe keyword, including unsafe-used code and unsafe-marked code. For a module that includes the unsafe-used code, a security condition required by the unsafe-marked code needs to be met, so that no security problem occurs in the system. This is a protection mechanism made for protecting system security, and therefore is incorporated into the trusted base. A module that includes the unsafe-marked code causes the system to generate more unsafe-used code modules. If the unsafe-used code module is incorporated into the trusted base, the unsafe-marked code needs to be synchronously incorporated. As the Rust operating system becomes increasingly large, if the unsafe-used code is not reduced and managed, the trusted base of the Rust operating system becomes increasingly large, which adversely affects security, stability, and maintainability of the operating system.

In some existing Rust operating systems such as Thesus, RedLeaf, and Tock, some efforts are made in managing the unsafe keyword. However, permission of a programmer to use the unsafe still cannot be effectively restricted, arbitrary writing of the unsafe keyword is not fundamentally prevented, and a code amount of the unsafe keyword and a security protection mechanism thereof cannot be effectively reduced. Consequently, the system still has a relatively great security and stability risk.

A person skilled in the art knows that in a running process, an operating system usually needs to continuously communicate with a peripheral device to implement a necessary basic function. Such a peripheral device includes, for example, a keyboard, a network adapter, a graphics card, and a sound card. Therefore, managing and communicating with the peripheral device is a basic and important task in the operating system. In the Rust operating system, the unsafe keyword usually needs to be used for communication and management related to the peripheral device. Therefore, in an existing Rust operating system, a device driver program of the peripheral device usually includes code using the unsafe keyword. In practice, the operating system is connected to many peripheral devices. If the unsafe code is used by driver programs of the peripheral devices without restriction, a trust problem and a security problem are caused. Therefore, in terms of device management, how to more effectively manage and restrict use of the unsafe keyword and reduce the system trusted base is of great significance for improving system security and stability.

Therefore, in the embodiments of this specification, a device management method and architecture are provided. FIG. 1 is a schematic diagram of a device management architecture according to an embodiment. Based on this architecture, to restrict, from the source, a programmer from arbitrarily writing code that includes unsafe and minimize a trusted base as much as possible, in the device management architecture of this solution, privileged code and non-privileged code in code related to communication with a peripheral device are separated, with a boundary defined between them. A privilege level includes only unsafe code and additional security protection mechanism code generated to achieve system security. Code logic at the privilege level needs to be strictly reviewed before being put into use. A non-privilege level has no permission to use the unsafe code. In this architecture, based on the solution provided in this embodiment, a driver program 20 of each peripheral device is located at the non-privilege level and has no permission to use the unsafe code. To implement device communication and management, a device management module 10 is provided at the privilege level, so that the device management module includes only necessary unsafe code and corresponding security protection code.

Specifically, in the device management architecture in FIG. 1, the device management module 10 further includes an interface module 101 and a kernel code module 102 in a data processing direction. The kernel code module 102 is shown in a gray background, indicating that the kernel code module 102 includes code identified by an unsafe keyword. The kernel code module 102 can perform, by using the unsafe code, a register operation and an assembly code operation related to communication with the peripheral device. The interface module 101 does not include the unsafe code, but provides assurance for correct and secure execution of the kernel code module 102 that includes the unsafe code, and is protection mechanism code made to protect system security, and therefore also belongs to the privilege level. In addition, the interface module 101 further serves as an interface provided to the device driver 20, and interacts with the device driver to shield a direct connection between the device driver and a code module that includes the unsafe keyword.

In an operating system, communication related to the peripheral device usually includes interrupt and device access. Therefore, in a horizontal direction of a shown management function, the device management module 10 can include an interrupt management module and an access management module. The interface module 101 and the kernel code module 102 respectively have different implementations in the interrupt management module and the access management module. Specifically, the interface module 101 can be embodied as an interrupt agent module in the interrupt management module, and can be embodied as a device instance in the access management module. When the device driver 20 sends an interrupt configuration-related request, the interrupt agent module establishes a connection and ensures interrupt configuration-related security assurance before performing a corresponding unsafe operation. When the device driver 20 sends a device access request, the device instance establishes a connection and ensures access-related security assurance before performing a corresponding unsafe operation.

Figure 2:
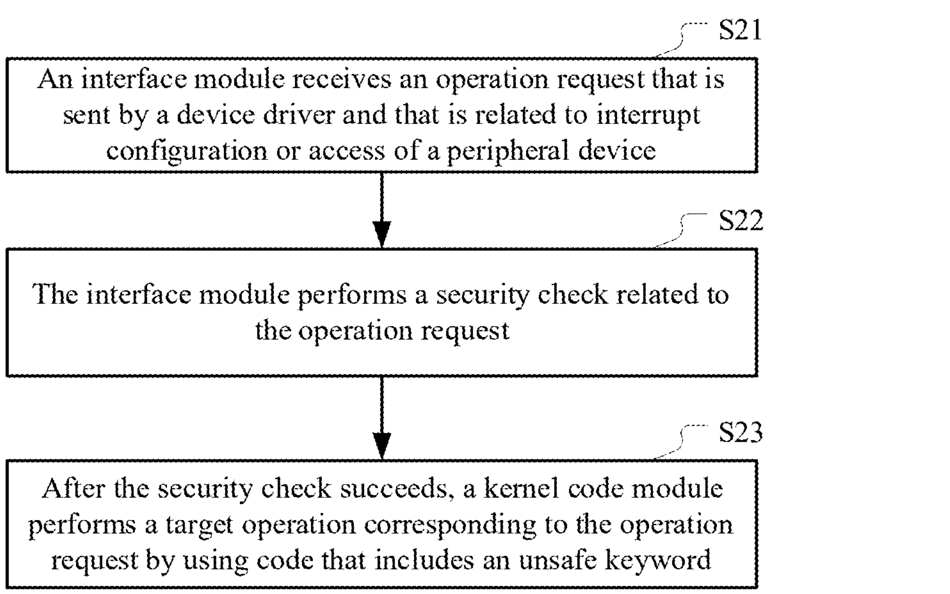
FIG. 2 is a flowchart of a method for device management according to an embodiment.

Corresponding to the above-mentioned architecture, FIG. 2 is a flowchart of a method for device management according to an embodiment. As shown in FIG. 2, the method includes the following steps. In step S21, an interface module receives a target request sent by a device driver, where the target request is an operation request related to interrupt configuration or access of a peripheral device. In step S22, the interface module performs a security check related to the operation request. In step S23, after the security check succeeds, a kernel code module performs a target operation corresponding to the operation request by using code that includes an unsafe keyword.

The following describes in detail an implementation of each module in the device management module and an implementation process of a management procedure in two cases of interrupt and access.

Figure 3:
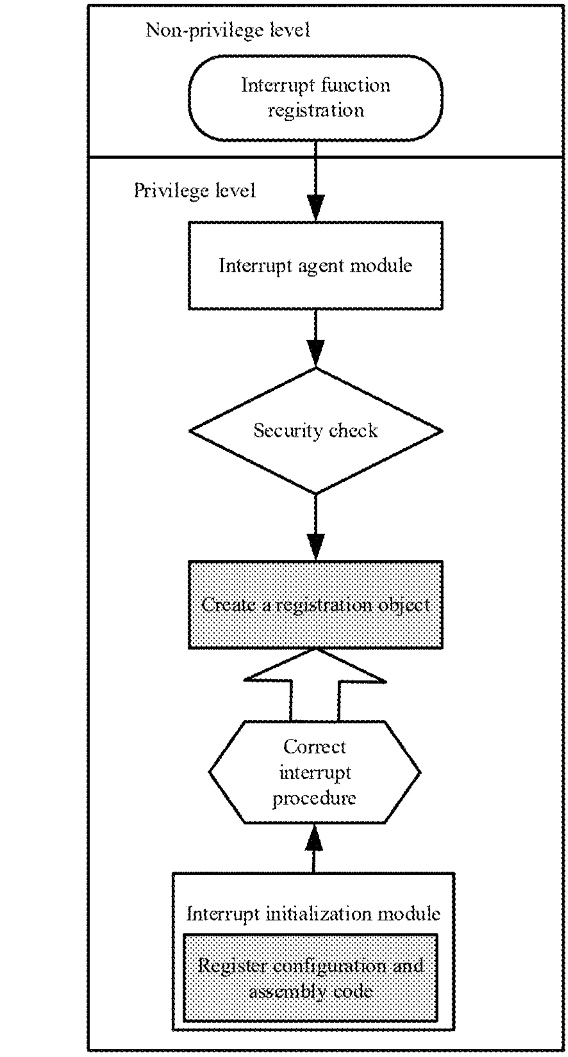
FIG. 3 is a schematic diagram of interrupt management according to an embodiment.

FIG. 3 is a schematic diagram of interrupt management according to an embodiment. In FIG. 3, an interrupt management module includes an interrupt initialization module and an interrupt agent module. The interrupt agent module is a specific implementation of the interface module 101 in FIG. 1 in a case of interrupt management.

The interrupt initialization module is configured to initialize an interrupt procedure when a system is started. Correct processing of an interrupt request subsequently sent by each peripheral device depends on correct initialization of the interrupt procedure. Initialization of the interrupt procedure includes register configuration and use of assembly code. All of these operations need to use an unsafe keyword. Therefore, the interrupt initialization module includes register configuration code and assembly code using the unsafe keyword, shown in gray. To ensure security, the interrupt initialization module, serving as a module that directly uses the unsafe keyword at a privilege level, needs to be verified and confirmed to meet a standard related to the interrupt procedure.

Based on correct initialization of the interrupt procedure, the peripheral device can register a corresponding interrupt service routine through a device driver. The interrupt service routine is usually embodied as a function that can be called to execute, which is referred to as an interrupt processing function below. The above-mentioned registration process is performed by the interrupt agent module that serves as an interface module.

Specifically, the interrupt agent module can provide an interface API for interrupt allocation. A driver program a of a peripheral device A can call the interface API to request to obtain an interrupt vector number instance, which is equivalent to sending an interrupt function registration request to the interrupt agent module. An interrupt vector number is an identifier used to distinguish between interrupts from different devices.

The interrupt agent module receives the call, and allocates a specific vector number, which is denoted as a first sequence number S-a, to the device driver a. In addition, the interrupt agent module further performs a corresponding security check. Specifically, the interrupt agent module checks whether the first sequence number is occupied by another device driver, to ensure that device drivers of different peripheral devices use different vector numbers, so as to avoid a device interrupt conflict. In addition, the interrupt agent module further needs to ensure that the first sequence number is not an interrupt vector number used by each type of CPU exception (for example, a page fault and a double fault). When it is ensured that the first sequence number is not occupied by any other interrupt body, the interrupt agent module returns an interrupt vector number instance, including the allocated first sequence number S-a, to the device driver a.

Therefore, the device driver a imports an interrupt processing function f-a of the peripheral device A into the interrupt agent module through an interface provided in the interrupt vector number instance. In addition, the device driver a further writes the first sequence number into a predetermined module of the peripheral device A.

The interrupt agent module can execute a kernel code module when receiving the interrupt processing function f-a. A registration object is created by using code that includes the unsafe keyword, and the interrupt processing function f-a and the first sequence number S-a are associatively recorded in the registration object. Specifically, in a Rust operating system, there can be a uniform entry for all interrupts, and an interrupt vector number and related information can be imported into an objective function in a Rust language. In the objective function, a dynamic array is created by using the Rust language. This array is used to store an interrupt processing function corresponding to the interrupt vector number. The interrupt processing function can be marked with a storage address of the interrupt processing function. In this way, a process of creating the registration object involves operations such as opening up space in a memory to create the object and importing an address. All of these operations need to use the unsafe keyword. Through such an operation, a correspondence between the interrupt processing function f-a and the first sequence number S-a can be recorded by using the registration object (for example, an array). In an example, before the kernel code module performs the associative recording, the interrupt agent module performs a related security check again, for example, checks whether a related parameter of the interrupt processing function has an obvious problem and whether an address allocated to the interrupt processing function is in a conflict.

When the interrupt processing function f-a and the first sequence number S-a are associatively recorded by the kernel code module, interrupt function registration of the peripheral device A succeeds. Therefore, the peripheral device A can communicate with the operating system and a CPU by using registration success information.

Specifically, when a specific event occurs in the peripheral device A and processing by the CPU needs to be requested, for example, when a keyboard receives an input and a network adapter receives a data packet, the peripheral device A sends an interrupt request IRQ. Because the first sequence number S-a is already written in a specific module of the peripheral device A, the peripheral device A carries the first sequence number S-a in the interrupt request IRQ. After obtaining the first sequence number S-a, the interrupt agent module queries the registration object, determines the interrupt processing function f-a corresponding to the registration object, and enables the CPU to execute the interrupt processing function f-a, to execute the service routine required by the peripheral device A. Therefore, the peripheral device communicates with the operating system and the CPU by using an interrupt mechanism, to implement efficient asynchronous data processing.

In the above-mentioned process, the interrupt agent module serves as a service intermediary, assists in registering the interrupt processing function, forwards an external interrupt request, and further performs necessary security checks. Because of the above-mentioned functions of the interrupt agent module, the device driver needs to interact only with the interrupt agent module to complete interrupt function registration. The device driver neither needs to perform an underlying operation by using unsafe code, nor needs to directly interact with a module that includes the unsafe code, and therefore can be disposed at a non-privilege level. In this way, use of the unsafe keyword by a writer of the device driver is restricted, and a code amount involving the unsafe keyword is reduced.

In an interrupt processing scenario, a CPU exception is a special type of interrupt. CPU exception processing involves modifying a register value returned after interrupt processing, which is an unsafe high-risk operation. Therefore, in an embodiment, the interrupt management module further includes a CPU exception processing module, and the CPU exception processing module modifies a restored register value by using the unsafe keyword. To ensure system security, the CPU exception processing module is located at the privilege level, and is repeatedly verified to meet a standard related to CPU exception processing.

The following describes device access-related processing.

Figure 4:
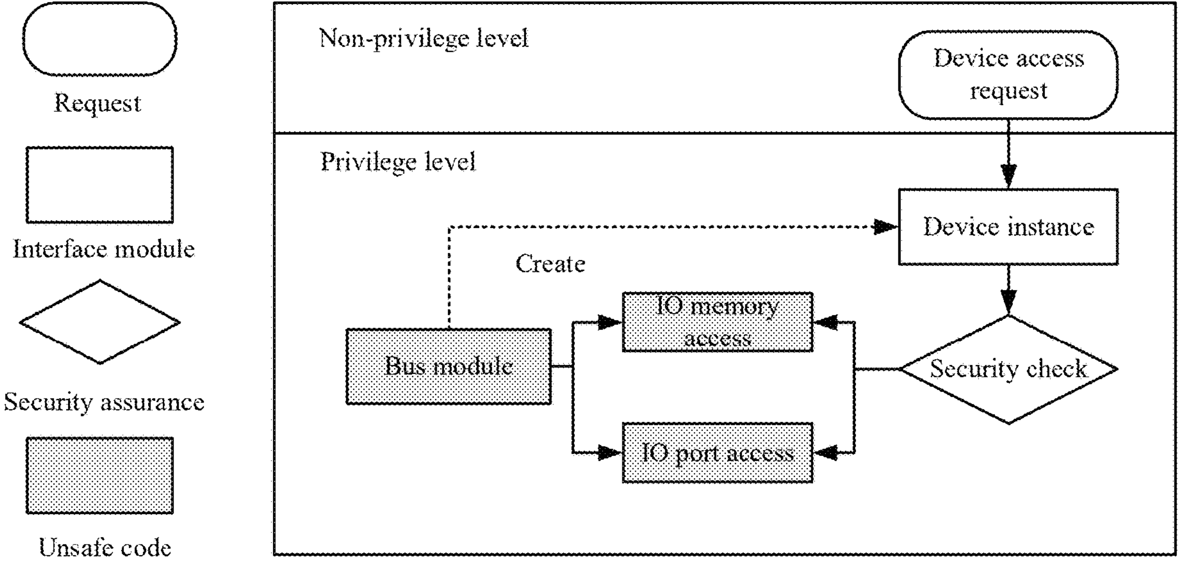
FIG. 4 is a schematic diagram of access management according to an embodiment.

FIG. 4 is a schematic diagram of access management according to an embodiment. As shown in FIG. 4, access related to a peripheral device includes discovery matching of the peripheral device, access to the peripheral device by a driver program, obtaining of device data, etc. At a bottom layer, there is conversion into two access manners: IO memory access and IO port access.

An IO memory is a special type of memory, and is used to implement communication between an operating system and the peripheral device. The IO memory is essentially a direct mapping of a register or memory of the peripheral device. A CPU is allowed to perform reading from and writing into the device register or memory by using a standard memory access instruction, to implement device control and data exchange. Therefore, the IO memory is not a part of a physical memory of a host, but belongs to the peripheral device. An address of the IO memory has a special address range in physical memory address space.

However, when accessing the address, the CPU does not access an actual RAM, but accesses the register or memory of the peripheral device. This mapping is implemented through memory-mapped I/O (MMIO).

A process of memory-mapped I/O is usually completed by a kernel of the operating system when the system is started and hardware is initialized. The operating system reserves a segment in system memory address space for the IO memory, and then maps a control register or memory of the peripheral device to this segment. In this way, the driver program in the operating system can interact with the peripheral device by accessing an address in this segment.

In Rust, IO memory access of the peripheral device can be encapsulated into a structure. A field layout of this structure is consistent with a layout of the register/memory of the peripheral hardware device. For example, if one hardware device has three registers: a control register, a counter register, and a preset value register, a structure can be defined, and the structure has three fields corresponding to the three registers. Then, the structure can be instantiated, that is, an original pointer is used to point to a physical address to which the memory of the peripheral device is mapped. The obtained structure instance can be incorporated into a device instance of the peripheral device.

IO port access is another mechanism for interacting with the peripheral device. This mechanism is different from memory-mapped I/O (MMIO). In IO port access, a dedicated CPU instruction instead of memory address space is used to access a device control register. A group of IO port addresses is allocated to each peripheral device, to receive and send data, control a device status, etc. An IO port has address space separated from common memory address space, and therefore has its own address range.

In an x86 architecture, IN and OUT instructions are usually used for IO port access, and these instructions allow the CPU to directly communicate with the IO port of the device. An instruction for communication with the IO port is usually an assembly instruction. For example, an instruction IN AL, 0x60 can be used to indicate that the device driver wants to read one byte of data from an IO port 0x60 to an AL register, and an instruction OUT 0x60, AL can be used to indicate that the device driver wants to write content of the AL register into the IO port 0x60.

IO port access can be encapsulated into a separate structure different from that of IO memory access.

Peripheral devices are connected by using a bus, and IO resource allocation and recording are performed based on the bus. For example, a typical and commonly used bus is a peripheral component interconnect (PCI) bus. In configuration space of each device in the PCI bus, there is a group of registers, that is, base address registers (BAR), used to define an address range of each memory and IO port on the device. More specifically, the BAR includes a memory BAR that specifies a memory address range for memory-mapped I/O of the device and a port BAR that specifies a group of IO port address ranges for port-mapped IO of the device. During system initialization, the operating system reads these BARs to determine an amount of memory or I/O space the peripheral device needs, and allocates a corresponding resource to the device in the address space of the system.

Therefore, according to this embodiment of this specification, as shown in FIG. 4, an access management module includes a bus module. The bus module is a code module related to a physical bus, and is configured to encapsulate an access path to the peripheral device into a device instance based on resource allocation of each peripheral device in the physical bus. As described above, the access path can include IO memory access and IO port access. For each peripheral device, the bus module encapsulates the two access manners in a separate structure, and creates a device instance based on this. In a process of creating the device instance, an unsafe keyword needs to be used to perform operations such as address range importing. Therefore, the bus module needs to be located at a privilege level and reviewed to meet a security standard related to the device instance. The security standard has at least the following requirements: 1. A created access object (device instance) accesses only a range to which the access object belongs in the bus. 2. During access by the device instance, a core register, for example, the BARs in the configuration space of each device in the bus, that severely affects a function of the bus or the device is not arbitrarily modified.

To implement the security standard, when creating the device instance, the bus module can encapsulate, in the device instance, logic code used for determining and checking. After the bus module securely creates the device instance, the device instance can function as an interface module, process an access request for the peripheral device, and perform a security check.

Specifically, the device driver can send an access request for the peripheral device. The access request can be an IO memory access request or an IO port access request. The device instance receives the access request, and performs a security check on the access request by using the logic code used for determining and checking. Specifically, the device instance can check whether an access address in the access request exceeds an address area range corresponding to the access path. The address area range corresponds to an area recorded in the BAR in the bus. More specifically, if the access request is an IO memory access request, it needs to be checked whether the access address exceeds the address range corresponding to the IO memory (corresponding to the address range recorded in the memory BAR); or if the access request is an IO port access request, it needs to be checked whether the access address exceeds the address range corresponding to the IO port (corresponding to the address range recorded in the port BAR).

In an optional embodiment, the device instance can further check whether the access request involves modification of the core register in the bus, and ensure that the access request does not modify the core register.

In this way, the device instance serves as an interface module to perform a security check on the access request, so as to ensure that no security problem occurs after the access is executed. After the security check succeeds, a core code module performs a corresponding access operation.

With reference to the above-mentioned cases of interrupt management and access management, it can be seen that in the device management architecture of this solution, there is a clear boundary between privileged code and non-privileged code. The device driver is located at the non-privilege level and has no permission to use unsafe code. The device management module is located at the privilege level, and includes the kernel code module that directly uses the unsafe code and the interface module that does not include the unsafe code but provides a security protection mechanism to the device management module. In addition, the interface module further functions as an interface, and interacts with a driver program at the non-privilege level. In this way, the unsafe code cannot be used in the driver program, and the privilege level includes only the unsafe code and necessary related security protection code, and needs to be reviewed before being put into use. This restricts a programmer from arbitrarily using the unsafe keyword, and minimizes a trusted base of the operating system, thereby improving system stability and security.

Figure 5:
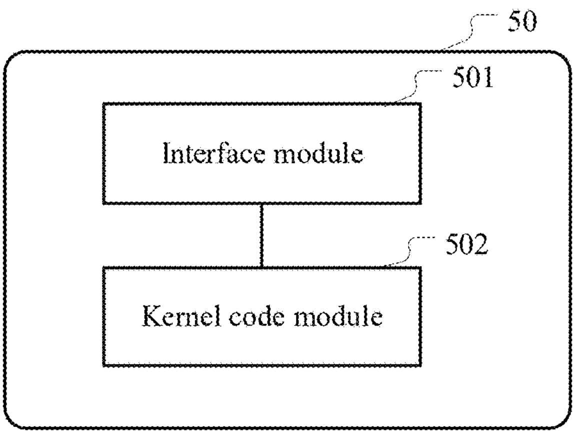
FIG. 5 is a schematic structural diagram of a device management apparatus according to an embodiment.

In addition, corresponding to the above-mentioned method process, an embodiment of this specification further provides a device management apparatus for device management in a target operating system. The target operating system is written in a Rust language. The Rust language includes an unsafe keyword. FIG. 5 is a schematic structural diagram of a device management apparatus according to an embodiment. As shown in the figure, the device management apparatus 50 includes an interface module 501 and a kernel code module 502.

The interface module 501 is configured to receive a target request sent by a device driver of a peripheral device, where the target request is an operation request related to interrupt configuration or access of the peripheral device. The interface module includes no code segment using an unsafe keyword. The device driver is disposed at a non-privilege level and has no permission to use the unsafe keyword.

The interface module 501 is further configured to perform a security check related to the operation request.

The kernel code module 502 is configured to: after the security check succeeds, perform a target operation corresponding to the operation request by using code that includes the unsafe keyword.

For a specific execution process example of the device management process, refer to the above-mentioned descriptions provided with reference to FIG. 2 to FIG. 4. Details are not described again.

According to an embodiment in still another aspect, a computing device is further provided, including a storage and a processor. The storage stores executable code, and when the processor executes the executable code, the method described with reference to FIG. 2 to FIG. 4 is implemented.

A person skilled in the art should be aware that in the above-mentioned one or more examples, functions described in this specification can be implemented by hardware, software, firmware, or any combination thereof. When being implemented by software, these functions can be stored in a computer-readable medium or transmitted as one or more instructions or code on a computer-readable medium.

In the above-mentioned specific implementations, the objectives, technical solutions, and beneficial effects of this specification are further described in detail. It should be understood that the above-mentioned descriptions are merely specific implementations of this specification, but are not intended to limit the protection scope of this specification. Any modification, equivalent replacement, improvement, etc. made based on the technical solutions of this specification shall fall within the protection scope of this specification.

What is claimed is:

1. A method for device management in a target operating system, wherein the target operating system is written in a Rust language, the Rust language comprises an unsafe keyword, the method relates to a device driver of a peripheral device and a device management module, the device driver is disposed at a non-privilege level and has no permission to use the unsafe keyword, the device management module is disposed at a privilege level and has permission to use the unsafe keyword, and the method comprises:

receiving, by an interface module in the device management module, a target request sent by the device driver, wherein the target request is an operation request related to interrupt configuration or access of the peripheral device, and the interface module comprises no code segment using the unsafe keyword;

performing, by the interface module, a security check related to the operation request; and after the security check succeeds, performing, by a kernel code module in the device management module, a target operation corresponding to the operation request by using code that comprises the unsafe keyword.

2. The method according to claim 1, wherein the target request comprises an interrupt function registration request of the peripheral device, and the interface module is an interrupt agent module that provides a first interface; and receiving, by the interface module in the device management module, the target request sent by the device driver comprises:

receiving, by the interrupt agent module, a call to the first interface from the device driver, wherein the call is used to request to obtain an interrupt vector number instance.

3. The method according to claim 2, wherein performing, by the interface module, the security check related to the operation request comprises:

determining, by the interrupt agent module, that there is a first sequence number to be allocated to the device driver, and checking whether the first sequence number is occupied by another device driver or a CPU exception; and upon determining that it is ensured that the first sequence number is not occupied, returning an interrupt vector number instance to the device driver, wherein the interrupt vector number instance comprises the first sequence number.

4. The method according to claim 3, further comprising:

receiving, by the interrupt agent module, an interrupt processing function of the peripheral device from the device driver, wherein the interrupt processing function is imported through an interface provided in the interrupt vector number instance; and performing, by the kernel code module, the target operation corresponding to the operation request by using code that comprises the unsafe keyword comprises:

creating a registration object by using the code that comprises the unsafe keyword, wherein the interrupt processing function and the first sequence number are associatively recorded in the registration object.

5. The method according to claim 4, further comprising:

receiving, by the interrupt agent module, an interrupt request from the peripheral device, wherein the interrupt request comprises the first sequence number; and determining, by the interrupt agent module, the interrupt processing function based on the first sequence number, and enabling a CPU to execute the interrupt processing function.

6. The method according to claim 1, wherein the device management module further comprises an interrupt initialization module, the interrupt initialization module comprises register configuration code and assembly code using the unsafe keyword, and the interrupt initialization module is verified to meet a first standard related to an interrupt procedure.

7. The method according to claim 1, wherein the device management module further comprises a CPU exception processing module, the CPU exception processing module modifies a restored register value by using the unsafe keyword, and the CPU exception processing module is verified to meet a second standard related to CPU exception processing.

8. The method according to claim 1, wherein the target request comprises an access request for the peripheral device, and the interface module is a device instance obtained by encapsulating an access path to the peripheral device; and performing, by the interface module, the security check related to the operation request comprises:

checking, by the device instance, whether an access address in the access request exceeds an address area range corresponding to the access path.

9. The method according to claim 8, wherein the access request is an IO memory access request, and the device instance comprises a structure instance that encapsulates an IO memory address area of the peripheral device.

10. The method according to claim 8, wherein the access request is an IO port access request, and the device instance comprises a structure instance that encapsulates an IO port address area of the peripheral device.

11. The method according to claim 8, wherein the device management module further comprises a bus module, and the method further comprises: creating, by the bus module, the device instance, so that the device instance comprises logic code for a security check.

12. The method according to claim 11, wherein the bus module is verified to meet a security standard related to a device instance, and the security standard requires that created device instances access only respective corresponding address ranges.

13. A computing device, comprising a storage and a processor, wherein the storage stores executable code, and when executing the executable code, the processor is caused to implement a method for device management in a target operating system, wherein the target operating system is written in a Rust language, the Rust language comprises an unsafe keyword, the method relates to a device driver of a peripheral device and a device management module, the device driver is disposed at a non-privilege level and has no permission to use the unsafe keyword, the device management module is disposed at a privilege level and has permission to use the unsafe keyword, and the method comprises:

receiving, by an interface module in the device management module, a target request sent by the device driver, wherein the target request is an operation request related to interrupt configuration or access of the peripheral device, and the interface module comprises no code segment using the unsafe keyword;

performing, by the interface module, a security check related to the operation request; and after the security check succeeds, performing, by a kernel code module in the device management module, a target operation corresponding to the operation request by using code that comprises the unsafe keyword.

14. The computing device according to claim 13, wherein the target request comprises an interrupt function registration request of the peripheral device, and the interface module is an interrupt agent module that provides a first interface; and receiving, by the interface module in the device management module, the target request sent by the device driver comprises: receiving, by the interrupt agent module, a call to the first interface from the device driver, wherein the call is used to request to obtain an interrupt vector number instance.

15. The computing device according to claim 13, wherein performing, by the interface module, the security check related to the operation request comprises:

determining, by the interrupt agent module, that there is a first sequence number to be allocated to the device driver, and checking whether the first sequence number is occupied by another device driver or a CPU exception; and upon determining that it is ensured that the first sequence number is not occupied, returning an interrupt vector number instance to the device driver, wherein the interrupt vector number instance comprises the first sequence number.

16. The computing device according to claim 14, wherein the method further comprises:

receiving, by the interrupt agent module, an interrupt processing function of the peripheral device from the device driver, wherein the interrupt processing function is imported through an interface provided in the interrupt vector number instance; and performing, by the kernel code module, the target operation corresponding to the operation request by using code that comprises the unsafe keyword comprises:

creating a registration object by using the code that comprises the unsafe keyword, wherein the interrupt processing function and the first sequence number are associatively recorded in the registration object.

17. The computing device according to claim 15, wherein the method further comprises:

receiving, by the interrupt agent module, an interrupt request from the peripheral device, wherein the interrupt request comprises the first sequence number; and determining, by the interrupt agent module, the interrupt processing function based on the first sequence number, and enabling a CPU to execute the interrupt processing function.

18. The computing device according to claim 13, wherein the device management module further comprises an interrupt initialization module, the interrupt initialization module comprises register configuration code and assembly code using the unsafe keyword, and the interrupt initialization module is verified to meet a first standard related to an interrupt procedure.

19. The computing device according to claim 13, wherein the device management module further comprises a CPU exception processing module, the CPU exception processing module modifies a restored register value by using the unsafe keyword, and the CPU exception processing module is verified to meet a second standard related to CPU exception processing.

20. A non-transitory computer-readable storage medium, wherein the storage medium stores a computer program, and when the computer program is executed by a processor, the processor is caused to implement a method for device management in a target operating system, wherein the target operating system is written in a Rust language, the Rust language comprises an unsafe keyword, the method relates to a device driver of a peripheral device and a device management module, the device driver is disposed at a non-privilege level and has no permission to use the unsafe keyword, the device management module is disposed at a privilege level and has permission to use the unsafe keyword, and the method comprises:

receiving, by an interface module in the device management module, a target request sent by the device driver, wherein the target request is an operation request related to interrupt configuration or access of the peripheral device, and the interface module comprises no code segment using the unsafe keyword;

performing, by the interface module, a security check related to the operation request; and after the security check succeeds, performing, by a kernel code module in the device management module, a target operation corresponding to the operation request by using code that comprises the unsafe keyword.

* * * * *